Aug. 27, 1968 W. P. HILL 3,398,599
PRECISION NUT FOR NUMERICAL CONTROL MACHINES
Filed March 3, 1967
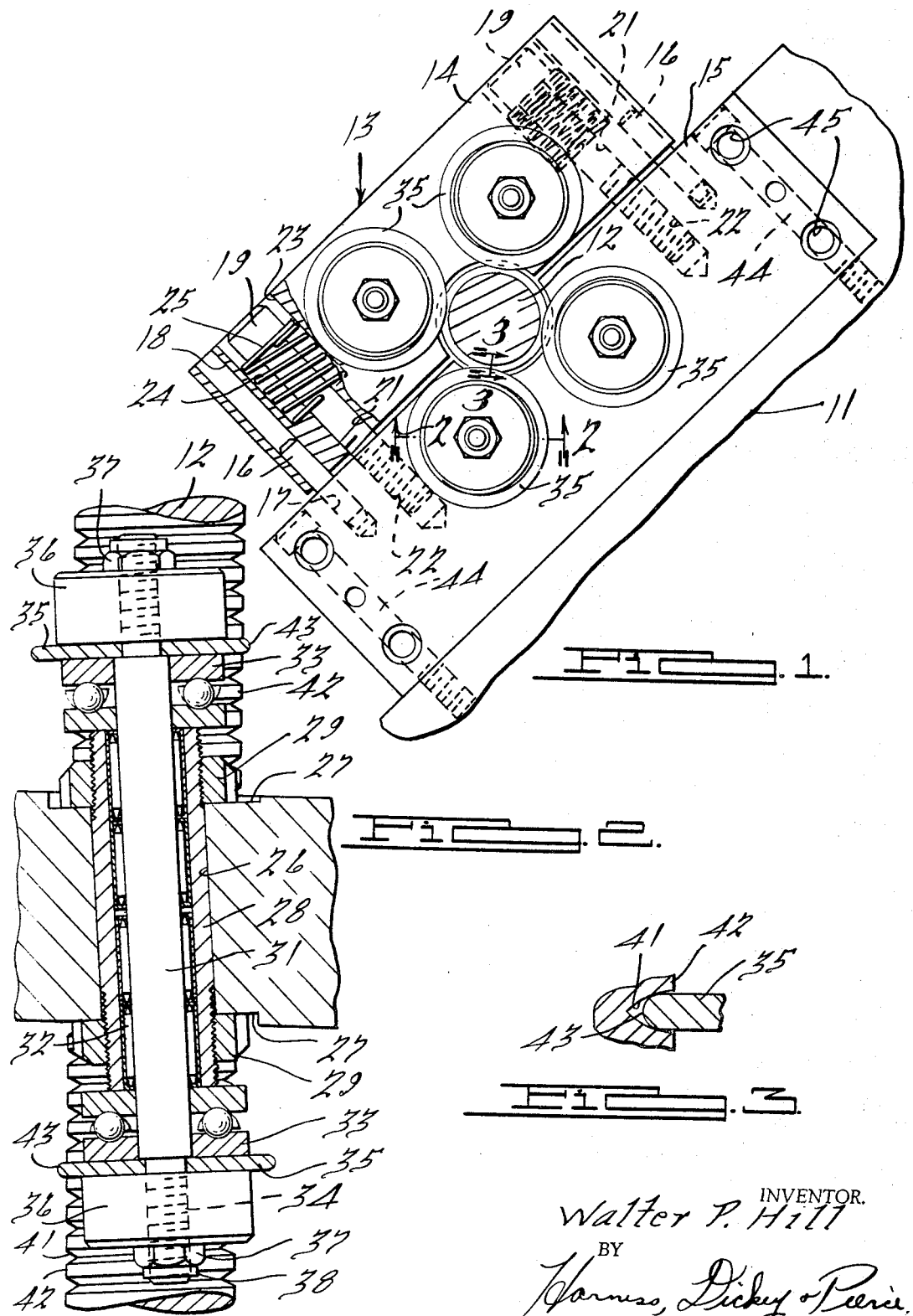
INVENTOR.
Walter P. Hill
BY
Harness, Dickey & Pierce
ATTORNEYS.

United States Patent Office 3,398,599
Patented Aug. 27, 1968

3,398,599
PRECISION NUT FOR NUMERICAL CONTROL MACHINES
Walter P. Hill, Bloomfield Hills, Mich., assignor to Walter P. Hill Inc., Troy, Mich., a corporation of Michigan
Filed Mar. 3, 1967, Ser. No. 620,351
7 Claims. (Cl. 74—441)

ABSTRACT OF THE DISCLOSURE

The disclosure pertains to a nut for a non-precision lead screw having discs at opposite ends of a plurality of rotatable shafts which extend within the groove of the lead screw thread and are permitted to move inwardly and outwardly thereof to follow the inaccuracy of the groove. The discs are retained in engagement with one, the other or both sides of the groove at all times and thereby prevents backlash and undesired movement relative to the lead screw.

---

This invention relates to precision nuts for numerical controlled machines and particularly to a lead screw nut for a numerical control machine which is free of backlash and vibration.

Background of the invention

Running balls in a cage within a groove of a lead screw, similar to that employed in the steering mechanism of a vehicle but precisely manufactured, are employed for moving a standard or other support for one or more tools to different positions on the bed of a numerically controlled machine. Such a precision lead screw with running balls is extremely expensive and is difficult to obtain at the present time due to a very substantial backlog.

Description of the prior art

The standard lead screws and nuts do not prevent backlash and relative longitudinal movement. Nuts have been split in the past, screwed apart to engage opposite sides of the groove of the thread, but such an arrangement can prove satisfactory only if the groove in the lead screw is of precise construction. The hardening of the lead screw causes it to extend or shorten and a grinding operation thereafter cannot assure a true groove throughout the length of the lead screw.

Summary of the invention

The present invention pertains to the use of a lead screw which has been accurately formed but which has been lengthened or shortened during the hardening process applied thereafter. This change in length may amount to as much as .020 of an inch in a foot length. With the nut of the present invention applied to such a lead screw, a numerically controlled machine may be accurately programmed to stop the tool in an exact position by the application of a brake to the driving motor. The nut comprises a pair of spaced blocks which are spring pressed toward each other with each block containing a pair of bearings disposed at a slight angle to the block face for supporting a shaft having a tracking disc and a thrust bearing at each end. The discs are of a thickness slightly less than the width of the groove of the lead screw and extend therewithin and move along with the blocks longitudinally of the lead screw as it is driven in either direction of rotation. The spring pressure between the blocks permit them to move toward and away from each other so as to retain the discs at all times in engagement with one, the other or both sides of the groove as the case may be, and thereby prevent any movement or backlash to occur between the nut and the lead screw in either direction of movement.

Brief description of the drawing

FIGURE 1 is a broken plan view of a lead screw and nut with the lead screw in section;

FIG. 2 is an enlarged broken sectional view of the structure illustrated in FIG. 1, taken on the line 2—2 thereof, and FIG. 3 is an enlarged broken sectional view of the structure illustrated in FIG. 1, taken on the line 3—3 thereof.

Description of the preferred embodiment

In a numerical control machine, a tool supporting standard 11 is movable on the base of a machine to precisely locate the tool through the driving of a lead screw 12 in the conventional manner. A nut 13 is carried by the lead screw which embodies a pair of metal blocks 14 and 15 which are movable toward and away from each other on dowel pins 16. The dowel pins are fixed in apertures 17 in the block 15 and slide in aperture 18 in the block 14. Studs 19 extend freely through apertures 21 in the block 14 and are threaded into threaded apertures 22 in the block 15. The apertures 21 are enlarged at 23 for receiving a spring 24 which is compressed by a washer 25 beneath the head of the studs 19. With this arrangement the blocks 14 and 15 are movable toward and away from each other controlled by the bias provided by the springs 24.

Each of the blocks 14 and 15 have a pair of apertures 26 provided therethrough and disposed at an angle to the block faces herein illustrated as at an angle of approximately 3°. This locates one end of the aperture at one side of the vertical line at the center of the block and the other end at the opposite side of the vertical line. The opposite faces of the blocks have an area 27 machined thereon which is at right angles to the apertures 26. A needle bearing sleeve 28 is secured within the apertures 26 by a pair of lock nuts 29 which are screwed upon the end threads of the sleeve and positions the ends relative to the area 27. A hardened shaft 31 is supported by needle rollers 32 within the sleeve 28 and thrust bearings 33 extend over the ends of the shaft and abut the ends of the bearing sleeve 28. Reduced threaded ends 34 of the shaft 31 support hardened washer-like discs 35 and heavy backup caps or washers 36. Each disc and washer is clamped in firm fixed relation on the ends of the shafts 31 by a lock nut 37.

In one arrangement, the lead screw 12 is mounted on the base of the machine, centrally between the ways of the base for rotation. The lead screw is driven at a predetermined speed through a gear reduction unit from a motor having a brake thereon which instantly stops the rotation of the lead screw when set (not shown). The lead screw herein illustrated is 1½" in diameter and has an ogive shaped groove 41 rolled therein on a 4-pitch lead forming a land 42 on the periphery of the lead screw body. Upon heat-treating the lead screw after the rolling operation, elongation or shortening thereof occurs so that the lead of the land and groove are no longer as precise as when originally rolled.

The discs 35 are slightly less in thickness than the grooves 41 and have a semicircular edge 43 to produce point contact with one or both walls of the land when extended within the groove. The four discs 35 at each end of the shafts 31 extend within the groove and, as pointed out hereinabove, are in contact with one, the other or both sides of the groove wall. Should the distortion of the wall cause a binding on one or more of the discs, the blocks 14 and 15 can move outwardly of each other to relieve the binding condition while maintaining contact with the groove wall. Since this occurs at both ends of the shafts 31 at spaced points along the lead screw 12, the blocks 14 and 15 will be carried along the lead screw in firm fixed relation thereto irrespective of any distortion in the groove and land. As a result, there can be no backlash in the driving of the nut in either direction and no movement can occur between the nut and the lead screw so that it is always fixed in firm relation therewith.

As illustrated in FIG. 1, when the lead screw is horizontally mounted the block 15 is secured to the standard or other tool supporting member 11 by screws 44. When the lead screw is vertically mounted, screws in apertures 45 of the block 15 secure the block to member 11. With this arrangement, the standard or other tool supporting member 11 of a numerical controlled machine is accurately moved on its ways to precisely locate a tool carried thereby relative to a workpiece without any play whatsoever occurring between the driven lead screw and the nut 13. The positioning of the sleeve 28 in the apertures 26 accurately locate the discs 35 at the ends of the shafts 31 relative to each other and to the groove 41 of the lead screw 12.

What is claimed is:

1. A driving nut for a numerical controlled machine secured to a movable tool supporting body along ways of the machine, said nut embodying a pair of spring pressed blocks movable toward and away from each other, each said block having at least one shaft journaled therein and supported at a slight angle to the face of the block, and a disc carried on each end of the shaft for extending into the groove of a lead screw at longitudinal spaced points therealong and maintained in engagement with at least one wall thereof by the urge of blocks toward each other.

2. A driving nut for a numerical controlled machine as recited in claim 1, wherein two shafts are provided in each of the blocks having a disc on the opposite end thereof and located in substantially diametrical relation at points of engagement with a lead screw.

3. A driving nut for a numerical controlled machine as recited in claim 2, wherein dowel pins in one block have sliding engagement in apertures in the other block for retaining the blocks' position relative to each other, screws threaded in one block having sliding engagement in the other block, and a spring on said screws for urging the blocks together.

4. A driving nut for a numerical controlled machine as recited in claim 2, wherein the shafts are journaled in needle bearings in apertures in the blocks, and securing means for the bearing by which they are positioned longitudinally within the aperture.

5. A driving nut for a numerical controlled machine as recited in claim 4, wherein thrust bearings are provided on the ends of the needle bearings.

6. A driving nut for a numerical controlled machine as recited in claim 5, wherein a thick washer is secured by a nut on each end of the shaft in firm fixed relation to said discs.

7. A driving nut for a numerical controlled machine as recited in claim 1, wherein the journals for the shafts are a bearing sleeve which has threaded ends so as to be adjustable lengthwise in the block when secured in position by a nut on each end thread, thrust bearings engaging the ends of the sleeves against which the discs are secured, a thick backup element on each end of the shafts engaging said discs, and means at each end of the shafts for securing the element, disc and thrust bearing in clamped relation to each other.

References Cited
UNITED STATES PATENTS

| 2,493,000 | 1/1950 | Linsley | 74—441 |
| 2,791,129 | 5/1957 | Russell | 74—441 |

FRED C. MATTERN, JR., *Primary Examiner.*

L. H. GERIN, *Assistant Examiner.*